United States Patent
Kurisu

(10) Patent No.: US 8,328,705 B2
(45) Date of Patent: Dec. 11, 2012

(54) CONVEYING ROLL, AND HEARTH ROLL IN A CONTINUOUS ANNEALING FURNACE

(75) Inventor: Yasushi Kurisu, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 893 days.

(21) Appl. No.: 12/305,645

(22) PCT Filed: Jul. 12, 2006

(86) PCT No.: PCT/JP2006/314196
§ 371 (c)(1),
(2), (4) Date: Apr. 2, 2009

(87) PCT Pub. No.: WO2007/148414
PCT Pub. Date: Dec. 27, 2007

(65) Prior Publication Data
US 2010/0234200 A1    Sep. 16, 2010

(30) Foreign Application Priority Data
Jun. 21, 2006 (JP) ................. 2006-170981

(51) Int. Cl.
*F16C 13/00* (2006.01)
(52) U.S. Cl. .................................................... 492/53
(58) Field of Classification Search .............. 492/53; 266/249
See application file for complete search history.

(56) References Cited

U.S. PATENT DOCUMENTS

| 4,909,485 A | 3/1990 | Yamaguchi et al. | |
| 5,070,587 A | 12/1991 | Nakahira et al. | |
| 5,161,306 A * | 11/1992 | Nakahira et al. | 492/53 |
| 5,304,519 A * | 4/1994 | Jackson et al. | 501/103 |
| 5,418,015 A * | 5/1995 | Jackson et al. | 427/452 |
| 5,466,208 A * | 11/1995 | Jackson et al. | 492/53 |
| 5,700,423 A * | 12/1997 | Gao | 266/103 |
| 2010/0230874 A1 * | 9/2010 | Kurisu et al. | 266/249 |

FOREIGN PATENT DOCUMENTS

| EP | 0 499 656 A1 | 8/1992 |
| JP | 3-75383 A | 3/1991 |
| JP | 7-47766 B2 | 5/1995 |
| JP | 7-57904 B2 | 6/1995 |
| JP | 7-268489 A | 10/1995 |

(Continued)

OTHER PUBLICATIONS

Korean Office Action for Application No. 10-2008-7030892 dated Feb. 14, 2011.

(Continued)

*Primary Examiner* — Helene Klemanski
(74) *Attorney, Agent, or Firm* — Birch, Stewart, Kolasch & Birch, LLP

(57) ABSTRACT

The present invention provides conveying rolls and hearth rolls in a continuous annealing furnace for producing steel sheet having flame sprayed coatings on their surfaces wherein the flame sprayed coatings are comprised of cermet having a ceramic ingredient content of 80 vol % or less or a heat resistant alloy, the flame sprayed coatings have oxide layers comprised of one or more of a flame sprayed metal, Cr, Si, Zr, or Al, and a ratio R/R1 of the roughness parameter R of the surface of the oxide layer measured based on JIS B0633 setting the cutoff value at an initial value and a roughness parameter R' measured setting the cutoff value at 1/10 of the initial value is 4 or more.

6 Claims, 2 Drawing Sheets

FOREIGN PATENT DOCUMENTS

| | | |
|---|---|---|
| JP | 10-168528 A | 6/1998 |
| JP | 2003-27204 A | 1/2003 |
| JP | 2005-105338 A | 4/2005 |
| JP | 2005-206863 A | 8/2005 |
| KE | 1996-0002788 B1 | 2/1996 |

OTHER PUBLICATIONS

Supplementary European Search Report dated Sep. 1, 2010 issued in corresponding European Patent application No. 06768272.4.

* cited by examiner

CONVEYING ROLL, AND HEARTH ROLL IN A CONTINUOUS ANNEALING FURNACE

TECHNICAL FIELD

The present invention relates to conveying rolls and hearth rolls in a continuous annealing furnace providing a flame sprayed coating on the surfaces and suppressing slip and walk of the metal sheet material at the time of processing and sticking of dust and buildup on the roll surfaces.

BACKGROUND ART

In facility producing metal sheet materials, in particular a steel-sheet process line, when making the conveying rolls rotate at a high speed to run steel sheet, slip and walk of the steel sheet, sticking of dust and buildup on the surfaces of the conveying rolls, and other phenomena occur. At the time of processing, if slip of the steel sheet occurs, slip flaws are formed on the surface of the steel sheet, and the surface quality is impaired. If walk occurs, the processing speed falls and the productivity drops.

Further, if dust sticks and buildup occurs on the surface of the conveying roll, the shape of the dust and the foreign matter is transferred to the surface of the steel sheet whereby the surface quality is impaired and the grade of the steel sheet dramatically falls. Not only that, touchup to remove the foreign matter stuck to the surfaces of the conveying rolls becomes necessary and the productivity drops.

Such a problem is particularly remarkable in hearth rolls in continuous annealing furnaces processing sheets in a high speed atmosphere.

Slip and walk of the steel sheet occur due to insufficient frictional force between the steel sheet and rolls. Therefore, to prevent slip and walk, it is necessary to increase the surface roughness of the conveying rolls to raise the coefficient of friction and to secure frictional force to suppress rising of the steel sheet. On the other hand, sticking of dust on the surface of the conveying rolls is the phenomenon of iron powder, sludge, or other foreign matter on the surface of the steel sheet sticking to the surfaces of the conveying rolls, while buildup is the phenomenon of iron, manganese oxide, etc. on the surface of the steel sheet sticking and building up on the surfaces of the conveying rolls.

To prevent these, it is effective to suppress sticking and catching of the iron powder, sludge, and foreign matter on the surface of the steel sheet causing sticking of dust and iron and manganese oxide etc. forming the source of buildup. It is necessary to reduce the surface roughness of the conveying rolls. That is, if adjusting the surface roughness of the conveying rolls to achieve both the prevention of slip and walk of the steel sheet and suppression of sticking of dust and buildup, optimization becomes difficult due to the contradictory nature of the measures.

As measures for suppressing slip and walk of the steel sheet and sticking of dust and buildup on the surfaces of the rolls, the method of forming a flame sprayed coating on the surfaces of the rolls, then dulling it (Japanese Patent Publication (A) No. 7-57904), the method of dulling the surface, then forming a flame sprayed coating (Japanese Patent Publication (A) No. 7-47766 and Japanese Patent Publication (A) No. 9-157826), the method of forming a flame sprayed coating, then polishing it (Japanese Patent Publication (A) No. 10-168527 and Japanese Patent Publication (A) No. 10-168528), and the method of dulling the surface, then forming a flame sprayed coating and further polishing it (Japanese Patent Publication (A) No. 7-22773, Japanese Patent Publication (A) No. 7-1021, Japanese Patent Publication (A) No. 7-39918, and Japanese Patent Publication (A) No. 2005-105338) have been proposed.

However, with each of these methods, achievement of both prevention of slip and walk of the steel sheet and prevention of sticking of dust and buildup on the surfaces of the rolls was difficult.

That is, in the method proposed in Japanese Patent Publication (A) No. 7-57904, lasers are used to drill holes. The side walls of the holes become sharp, so clogging by dust more easily occurs. Further, the lasered parts suffer from microcracks, so the surface roughness becomes larger and sticking of dust and buildup easily occur. Further, in the method proposed in Japanese Patent Publication (A) No. 7-47766 and Japanese Patent Publication (A) No. 9-157826, the surface of the flame sprayed coating becomes a rough surface as flame sprayed and sticking of dust and buildup easily occur. Further, with the method proposed in Japanese Patent Publication (A) No. 10-168527 and Japanese Patent Publication (A) No. 10-168528, the surface roughness Ra becomes smaller and slip and walk of the steel sheet easily occur. Further, the method proposed in Japanese Patent Publication (A) No. 7-22773, Japanese Patent Publication (A) No. 7-1021, and Japanese Patent Publication (A) No. 7-39918 reduces the surface roughness of only projecting parts formed at the surface of flame sprayed coatings. There was the problem that when conveying steel sheet softened at a high temperature, the inclined parts near the projections contacted the steel sheet and easily formed buildup at the rolls.

Further, Japanese Patent Publication (A) No. 2005-105338 proposes shot blasting or brushing to treat the surface of the flame sprayed coating and set the ratio R/R' between a roughness parameter R (any of Ra, Rq, Rp, Rv, and Rz) measured based on JIS B0633 setting the cutoff value to an initial value and a roughness parameter R' measured setting the cutoff value to $\frac{1}{10}$ of the initial value to 4 or more so as to suppress buildup. However, with this method, the fine relief of the surface of the flame sprayed coating could be reduced, but there was the problem that the shot blasting or brushing ended up causing the formation of a new modified layer on the surface of the flame sprayed coating and due to this sticking of dust and buildup could not be completely prevented.

DISCLOSURE OF THE INVENTION

Therefore, the present invention has as its object to solve the problems in the prior art explained above and to provide conveying rolls and hearth rolls in a continuous annealing furnace solving the problems of sticking of dust and buildup on the flame sprayed coating.

The inventors first tried shot blasting or brushing the flame sprayed coating based on the Japanese Patent Publication (A) No. 2005-105338. As a result, it was confirmed that the micro relief on the surface becomes smaller and a certain degree of sticking of dust and buildup can be suppressed.

However, the effect of suppression is not sufficient, so the inventors investigated the cause in various ways. As a result, if shot blasting or brushing the surface of the flame sprayed coating, with a cermet flame sprayed coating, newly formed metal surfaces are exposed at the surface of the flame sprayed coating, the reactivity is increased, and dust and sources of buildup easily stick, further, with a ceramic flame sprayed coating and cermet flame sprayed coating with a large ceramic ingredient, cracks form in the ceramic in the flame sprayed coating and its surroundings, and dust and sources of buildup are easily caught there, so as a result causes of sticking of dust and buildup were confirmed to occur.

The inventors discovered that, as means for solving this problem, it is effective to make the ceramic content of the flame sprayed coating ingredients 80 vol % or less and to shot blast or brush the surface of the flame sprayed coating, then treat it by oxidation, chromic acid, or forming a silica or other oxide coating and thereby completed the present invention.

The present invention has as its gist the following:

(1) A conveying roll for producing steel sheet having a flame sprayed coating on its surface, said conveying roll characterized in that the flame sprayed coating is comprised of cermet with a ceramic ingredient content of 80 vol % or less or a heat resistant alloy, the flame sprayed coating has an oxide layer of one or more types of a flame sprayed metal, Cr, Si, Zr, and Al on it, and a ratio R/R' of a roughness parameter R of the surface of said oxide layer measured based on JIS B0633 setting a cutoff value to an initial value and a roughness parameter R' measured setting a cutoff value to 1/10 of said initial value is 4 or more.

(2) An above conveying roll, said conveying roller characterized in that said roughness parameter is any of an arithmetic mean roughness Ra, root mean square roughness Rq, maximum peak height Rp of roughness curve, maximum valley depth Rv of roughness curve, and maximum height roughness Rz.

(3) An above conveying roll, said conveying roll characterized by further having an undercoat layer of a heat resistant alloy between a roll matrix surface and the flame sprayed coating.

(4) An above conveying roll, said conveying roll characterized in that the oxide layer has a thickness of 0.01 μm to 10 μm.

(5) A hearth roll in a continuous annealing furnace using an above conveying roll, said hearth roll in a continuous annealing furnace characterized in that a roughness parameter Ra of a straight part of the circumference measured setting the cutoff value to 2.5 mm is 2 μm or more.

(6) An above hearth roll in a continuous annealing furnace, said hearth roll in a continuous annealing furnace characterized in that it has a straight part at a center part in the axial direction of the circumference, is provided with tapered parts at the two ends of said straight part, and has a roughness parameter Ra of said tapered parts measured setting the cutoff value at 0.8 mm of 0.1 to 2 μm.

According to the present invention, it is possible to provide conveying rolls able to simultaneously solve the slip and walk of steel sheet becoming a problem at the time of processing and sticking of dust and buildup, in particular hearth rolls in a continuous annealing furnace, it is possible to prevent flaws in the steel sheet due to the conveying rolls and hearth rolls in a continuous annealing furnace to improve the quality of the steel sheet, high speed, stable processing becomes possible, the productivity can be improved, and other remarkable effects useful in industry can be exhibited.

BEST MODE FOR CARRYING OUT THE INVENTION

Figure 1:
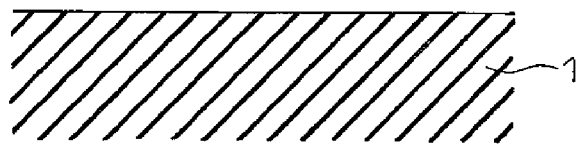
FIG. 1 is a schematic view depicting the routine for fabrication of conveying rolls of the present invention and shows a matrix material roll.

The inventors worked to solve the problems of slip and walk of the steel sheet and sticking of dust and buildup by first preparing conveying rolls having flame sprayed coatings on their surfaces and conveying rolls shot blasted or brushed on the surfaces of the flame sprayed coatings and evaluating the same. As a result, it was confirmed that the worked coating surfaces all have less micro relief and macro relief having heights of several μm to tens of μm and pitches of tens to hundreds of μm could be maintained.

To quantitatively evaluate the shapes of the conveying roll surfaces, the inventors measured the roughness parameters. With the coating as sprayed, the Ra at a cutoff value of 2.5 mm was 5.6 μm and the Ra' at a cutoff value of 0.25 mm was 2.1 μm, while with the coating after shot blasting, the Ra at a cutoff value of 2.5 mm was 5.4 μm and the Ra' at a cutoff value of 0.25 mm was 0.9 μm and with the coating after brushing, the Ra at a cutoff value of 2.5 mm was 5.5 μm and the Ra' at a cutoff value of 0.25 mm was 0.9 μm. It was confirmed that with the coating as flame sprayed, the shot blasted coating, and the brushed coating, the ratios Ra/Ra' of the roughness parameters were 2.7, 6.0, and 6.1 and in the shot blasted coatings and brushed coatings with ratios R/R' of the roughness parameters of 4 or more, slip and walk of the steel sheet could be prevented and sticking of dust and buildup could be suppressed to a certain degree.

However, with just shot blasting or brushing, while the occurrence of sticking of dust and buildup can be suppressed, it is not sufficient. The inventors investigated the causes in various ways.

As a result, the inventors discovered that there are mainly two causes for this.

First, with a cermet flame sprayed coating, if shot blasting or brushing the surface of the flame sprayed coating, newly formed metal surfaces are exposed on the surface. These are susceptible to sticking and reaction, so sticking of dust and buildup occurred there. Second, with ceramic flame sprayed coating and a cermet flamed sprayed coating with a large ceramic content, cracks are formed in the ceramic in the flame sprayed coating and its surroundings due to the shot blasting or brushing. Dust and sources of buildup easily are caught in these cracks, so sticking of dust and buildup occurred there.

The inventors discovered the following two points as means for solving this problem.

First, shot blast or brush the surface of the flame sprayed coating, then form on the surface an oxide layer comprised of one of more types of the metal ingredient (flame sprayed metal) in the flame sprayed coating, Cr, Si, Zr, and Al. That means that the flame sprayed coating is oxidized, chromic-acid treated, or processed to form an oxide coating comprised of one or more of silica, zirconia, and alumina. Due to this, the new metal surface newly exposed after the shot blasting or brushing is covered by an oxide coating, so no sticking of dust and buildup occurs.

Second, make the ceramic ingredient of the cermet flame sprayed coating 80 vol % or less. Due to this, the shot blasting or brushing causes the metal ingredient in the coating to plastically deform and thereby absorb the deformation of the coating and can prevent cracks forming in the ceramic in the coating and its surroundings.

Below, the present invention will be explained in detail.

The present invention provides a conveying roll, in particular a hearth roll in a continuous annealing furnace, characterized by having a flame sprayed coating comprised of cermet with a ceramic ingredient content of 80 vol % or less or a heat resistant alloy, having on the coating an oxide layer of one or more types of a flame sprayed metal, Cr, Si, Zr, and Al, and having a ratio R/R' of a roughness parameter R of the surface measured based on JIS B0633 setting a cutoff value to an initial value and a roughness parameter R' measured setting a cutoff value to 1/10 of said initial value is 4 or more.

The content of the ceramic ingredient in the flame sprayed coating can be made 80 vol % or less by using a powder material adjusted in the ratio of the metal and ceramic in advance for the flame spraying. It is also possible to make the content 80 vol % or less by flame spraying while adjusting the feed rates of two types of powders of the metal and ceramic. Further, it is possible to confirm the content of the ceramic ingredient by observing the cross-sectional structure of the coating after the flame spraying by for example an SEM.

Here, the higher the content of the ceramic ingredient in the flame sprayed coating, the higher the strength, while the lower, the higher the toughness. Therefore, the present invention makes the ceramic content of the cermet flame sprayed coating 80 vol % or less so as to enable shot blasting or brushing to cause the metal ingredient in the coating to plastically deform and absorb deformation of the coating and prevent formation of cracks in the ceramic in the coating and its surroundings. Further, if the high temperature strength of the heat resistant alloy forming the matrix is sufficient for practical use, the content of the ceramic ingredient in the flame sprayed coating can be made 0 vol % and the flame sprayed coating may be comprised of only a heat resistant alloy.

As flame sprayed, the surface of the flame sprayed coating has micro relief left on it, so for example the surface of the flame sprayed coating is blasted by metal or ceramic balls of a diameter of 10 to 5000 µm for shot blasting or is brushed by a ceramic or ceramic abrasive-containing resin brush disk applied to its surface.

After the shot blasting or brushing, the surface is treated to oxidize it to obtain an oxide layer of a flame sprayed metal, is treated by chromic acid to obtain a chromic acid compound layer, or is treated to form an oxide coating to obtain an oxide layer of one or more types of silica, zirconia, and alumina.

The treatment for oxidation of the flame sprayed coating, treatment by chromic acid, or treatment for forming an oxide coating of one or more of silica, zirconia, and alumina enables the exposed parts of the newly formed metal surfaces to be covered by an oxide and fills the extremely fine pores and cracks on the surface to remarkably improve the smoothness of the surface, so can suppress sticking of dust and buildup.

However, if the thickness of the coating due to these treatments becomes greater than necessary, the reaction with the ingredients causing the sticking of dust and buildup, for example, the Fe, Mn, and oxides of the same, is promoted, so it is necessary to make the thin film 10 µm or less. Further, if the coating thickness is 0.01 µm or more, sticking of dust and buildup can be prevented.

The oxidation treatment is performed in the atmosphere under conditions of a high temperature of 300° C. to 600° C. for 10 min to 10 hr or so. By this treatment, a 0.01 to 10 µm thick flame sprayed metal oxide layer is obtained.

The chromic acid treatment is performed by dipping in, coating by, or spraying by an aqueous solution containing chromic acid in 5 to 90 vol %, then firing at 350° C. to 550° C. By repeating this, it is possible to change the thickness of the treated coating, but each time the treatment is increased, the coating becomes thicker, so it is preferable to end this by treatment within three times. By this treatment, a chromic acid compound layer of a thickness of 0.01 to 10 µm is obtained.

The treatment to form an oxide coating comprised of one or more of silica, zirconia, and alumina is for example performed by dipping in, coating by, or spraying by an alcohol aqueous solution containing 5 to 90 vol % of one or more of silicon, zirconium, aluminum alkoxide, then firing at 100° C. to 500° C. By repeating this, it is possible to change the thickness of the treated coating, but in this case as well, the thickness becomes thicker with each increased treatment, so it is preferable to end the treatment within 10 times or less. By this treatment, a 0.01 to 10 µm thick silica, zirconia, alumina, or other oxide layer is obtained.

Regarding the roughness parameter, the ratio R/R' between the roughness parameter R measured based on JIS B0633 setting the cutoff value to an initial value and the roughness parameter R' measured setting the cutoff value to 1/10 of the initial value is used. For measurement of the surface roughness, the initial value of the cutoff value is determined based on JIS B0633 in accordance with the numerical value of the roughness parameter. For example, when Ra is in the range of 2 to 10 µm, the initial value of the cutoff value should be set to 2.5 mm.

Here, the roughness parameters R and R' may be any of the arithmetic mean roughness Ra, root mean square roughness Rq, maximum peak height Rp of roughness curve, maximum valley depth Rv of roughness curve, and maximum height roughness Rz described in JIS B0601. Among these, the most general roughness parameter used for design of rolls is Ra. For example, for hearth rolls in a continuous annealing furnace, as the roughness parameter, Ra is preferably employed.

If shot blasting or brushing the surface, the micro relief on the surface becomes smooth, but macro relief remains. Due to this, the roughness parameter R will not change, but the roughness parameter R' will become smaller. By shot blasting or brushing, R/R' becomes 4 or more, so slip and walk of the steel sheet can be prevented and sticking of dust and buildup can be suppressed. Note that the upper limit of the R/R' is not particularly defined, but from the practical limit where the R' becomes small, it is usually preferably 10 or less.

Further, at the hearth rolls in a continuous annealing furnace, if the roughness parameter Ra measured setting the cutoff value at 2.5 mm is smaller than 2 µm, the steel sheet easily slips and walks, so the parameter is preferably 2 µm or more. If the macro relief is large, the relief at the roll surfaces is transferred to the steel sheet and the surface quality of the steel sheet is sometimes impaired, so the upper limit is preferably made 30 µm or less.

The roughness parameter may be measured directly at the surfaces of the conveying rolls or hearth rolls in a continuous annealing furnace after flame spraying or by sampling small pieces, but may also be measured by using samples of small pieces cut out from these materials or small pieces of steel sheet or cast steel of the same materials flame sprayed under the same conditions. Further, when pretreating the surfaces of the conveying rolls or hearth rolls in a continuous annealing furnace by grit blasting to improve the adhesion of the flame sprayed coating and imparted roughness, it is preferable to perform pretreatment in the same way at the surface of the sample for measurement of roughness.

Among the treatment for oxidation, treatment by chromic acid, and treatment for forming an oxide coating, after each treatment, the macro and the micro surface roughness does not change much at all.

Further, the thickness of the flame sprayed coating is, including the undercoat layer, usually 20 to 300 µm in range.

In the hearth rolls in a continuous annealing furnace, the 500 to 1000 mm at the center part in the axial direction is made flat and the two ends are given tapered parts inclined by a radial reduction/tapered part length ratio of 0.1/1000 to 10/1000 to impart a crown to the rolls. In this case, the tapered parts preferably have a roughness parameter Ra at a cutoff value of 0.8 mm of 0.1 to 2 µm. If the roughness parameter Ra of the tapered parts is smaller than 0.1 µm, the slip of the steel sheet increases, while if it is larger than 2 µm, buckling easily occurs due to the throttling phenomenon at the center part of the steel sheet.

Next, the method of production of conveying rolls and hearth rolls for an annealing furnace of the present invention will be explained.

First, as the roll matrix material, stainless steel-based heat resistant cast steel is used. In particular, SCH22 is optimal.

The surfaces of the conveying rolls and the hearth rolls for annealing furnaces of the present invention are formed with flame sprayed coatings or their undercoat layers by grit blasting to improve the adhesion and impart roughness, then performing high velocity flame spraying process, high velocity oxygen-fuel thermal spraying process (HVOF), detonation gun process (D-gun), plasma flame spraying, etc. under ordinary flame spraying conditions.

Due to this, it is possible to obtain a flame sprayed coating having macro relief of a surface roughness parameter Ra of 2 to 30 µm measured based on JIS B0633 setting the cutoff value to 2.5 mm.

When using HVOF for flame spraying, preferably the fuel gas is made either of kerosene, $C_3H_8$, $C_2H_2$, or $C_3H_6$, the pressure of the fuel gas is made 0.1 to 1 MPa, the flow rate of the fuel gas is made 10 to 500 liters/min, the pressure of the oxygen gas is made 0.1 to 1 MPa, and the flow rate of the oxygen gas is made 100 to 1000 liters/min.

Further, in the case of plasma flame spraying, preferably the working gas is made either of Ar—$H_2$ and He, the flow rate of the working gas is made 100 to 300 liters/min, and the output is made 10 to 200 kW.

The particle size of the powder material of these flame sprayed coatings is preferably 10 to 50 µm.

The flame sprayed coating suppresses the buildup on the conveying rolls and hearth rolls in a continuous annealing furnace by selecting a ceramic comprised of $CrB_2$, $ZrB_2$, $Cr_3C_2$, $ZrO_2$, $Al_2O_3$, $Cr_2O_3$, $Y_2O_3$, or their composite oxides and cermet comprised of CoNiCrAlY, CoCrAlY, NiCoCrAlY, or another heat resistant alloy. Further, the heat resistant alloy used as the flame sprayed coating or the heat resistant alloy used for the undercoat layer of the flame sprayed coating is preferably any of the above CoNiCrAlY, CoCrAlY, NiCoCrAlY, etc.

EXAMPLES

Below, examples will be used to explain the present invention in further detail.

Figure 2:
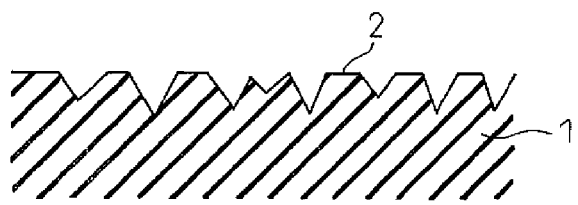
FIG. 2 is a schematic view depicting the routine for fabrication of conveying rolls of the present invention and shows alumina grit blasting.
Figure 3:
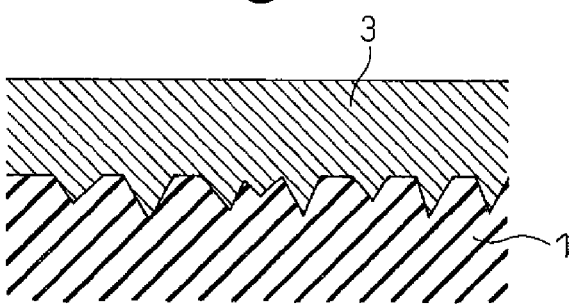
FIG. 3 is a schematic view depicting the routine for fabrication of conveying rolls of the present invention and shows an undercoat layer of a heat resistant alloy.

The surface of a roll matrix material 1 using SCH-22 shown in FIG. 1 as a material was blasted by alumina grit as shown in FIG. 2. The surface roughness of the roll matrix material surface 2 at this time is made a surface roughness parameter Ra of a cutoff value of 2.5 mm of 2 to 10 µm in range. In some cases, as shown in FIG. 3, the roll matrix material surface is given an undercoat layer 3 of the above heat resistant alloy.

Figure 4:
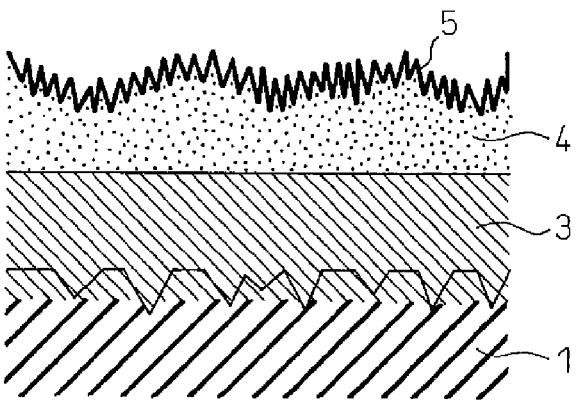
FIG. 4 is a schematic view depicting the routine for fabrication of conveying rolls of the present invention and shows a cermet flame sprayed coating.

On the matrix material or on the undercoat layer, as shown in FIG. 4, a flame sprayed coating 4 comprised of a heat resistant alloy or cermet is formed by HVOF, D-gun, or plasma flame spraying to a thickness of 50 to 300 µm to prepare various types of flame sprayed samples.

Note that the flame spraying conditions were made the usual ranges. As the matrix material roll 1, flat rolls of diameters of 1 m were used, but some were made smaller in diameter at the ends than the diameter at the center by about 2 mm to give a crown roll with a flat 700 mm center part in the axial direction and inclined tapered parts at the two ends.

Next, the sample surfaces were either shot blasted by blasting metal or ceramic balls of diameters of 10 to 5000 µm or brushed by a ceramic brush or ceramic abrasive-containing resin brush (surface treated). The Ra and Rz of the flame sprayed coatings were measured at a cutoff value of 2.5 mm and a cutoff value of 0.25 mm. At this point of time, the inventors measured the surface roughness and confirmed that the R/R' was at least 4.

Figure 5:
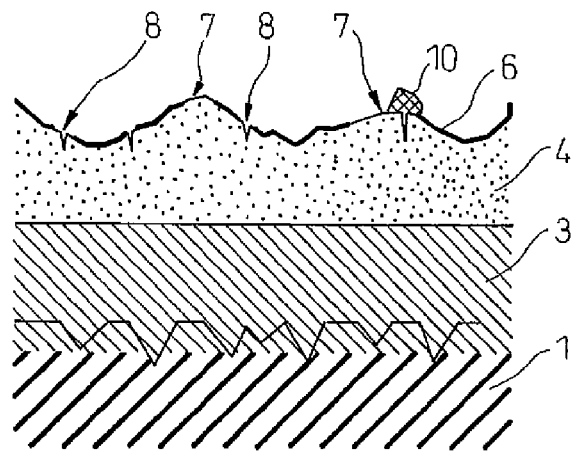
FIG. 5 is a schematic view depicting the routine for fabrication of conveying rolls of the present invention and shows microcracks and newly formed surfaces on the roll surface.

That is, the roll surface at this point of time is smooth on a micro basis and has relief on a macro basis, but as shown in FIG. 5 microcracks 8 and newly formed surfaces 7 were slightly exposed. If using a roll in this state, buildup sources 10 could stick to the microcracks 8 and newly formed surfaces 7.

The oxidation treatment is performed in the atmosphere at 400° C. By this treatment, a 0.1 µm or so thick flame sprayed metal oxide layer 12 is obtained.

As the chromic acid treatment, a 60% chromic acid aqueous solution is sprayed, then fired at 550° C. for 5 hr. This was repeated 2 times. By this treatment, a 0.1 µm or so thick chromic acid compound layer is obtained. As the treatment for forming the oxide coating of silica, zirconia, and alumina, a 10% metal alkoxide alcohol aqueous solution of silicon, zirconia, and alumina was sprayed, then the roll was fired at 200° C. two times. By this treatment, 1 µm or so thick oxide layer was obtained.

Figure 6:
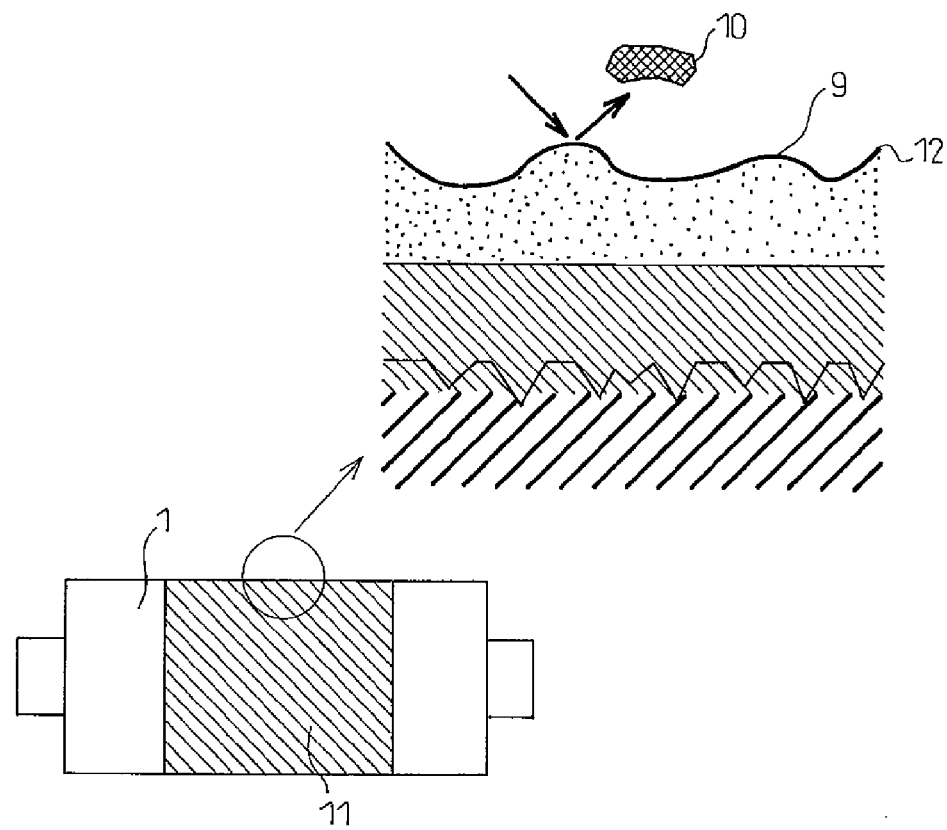
FIG. 6 is a schematic view depicting the routine for fabrication of conveying rolls of the present invention and showing the roll surface.

Due to each of these treatment for oxidation, treatment by chromic acid, and treatment for forming an oxide coating (treatment after processing), as shown in FIG. 6, it was possible to eliminate the exposure of microcracks 8 and newly formed metal surfaces at the roll surface. Due to this, for example, even after the buildup source 10 strikes the roll surface 9, the buildup source 10 will not stick.

The Ra and Rz of the flame sprayed coating prepared under the above conditions were measured again at a cutoff value of 2.5 mm a cutoff value of 0.25 mm for final evaluation.

The results after applying the coatings of the present invention to hearth rolls in the soaking zone of actual continuous annealing furnaces (rolls: ϕ1 m, atmosphere: temperature 850° C., nitrogen-hydrogen 3%, dew point −30° C., steel sheet: tensile strength 10 MPa, steel sheet average thickness 1 mmt, speed 300 mpm, steel type: high tensile strength) and using the rolls for one year are shown in Table 1.

Invention Examples 1 to 9 are conveying rolls produced by the above series of production methods while changing the composition of the flame sprayed coating. These all were resistant to slip during conveyance of the steel sheet and thereby did not suffer from walk. As a result, the processability was good. Further, even after one year of use, buildup did not occur. Good processability could be maintained from the start to finish in one year.

Invention Example 10 is Invention Example 1 under the flame sprayed coating layer of which an undercoat layer is formed. In the same way as Invention Example 1, the processability and buildup resistance were maintained even after one year of use. This undercoat layer has a higher ductility and toughness compared with the flame sprayed coating and has a higher fatigue strength and longer life compared with a flame sprayed coating without an undercoat layer.

Invention Example 11 is the same as Invention Example 4, but uses a crown roll. The roll shape differs, but in the same way as in Invention Example 4, even after one year, the processability and buildup resistance could be maintained.

On the other hand, in Comparative Examples 1 to 3 not treated after being worked such as treatment for oxidation compared to the present invention, the processability was maintained for one year, but buildup occurred after one year of use. This started from the microcracks and newly formed surfaces exposed slightly on the surface.

Further, in Comparative Example 4 not shot blasted or otherwise surface process or treated after processing, buildup strongly occurred, walk occurred, and even the processability became inferior.

Therefore, as shown in Table 1, it was learned that rolls having flame sprayed coatings of the present invention were high in processability and had extremely superior resistance to buildup. The advantageous effects of the present invention were confirmed.

TABLE 1

|  |  | Flame sprayed coating material | Thickness ($\mu$m) | Flame spraying gun | Surface processing method | Treatment after processing |
|---|---|---|---|---|---|---|
| Inv. ex. | 1 | 80 vol % $Al_2O_3$—CoCrAlY | 70 | HVOF | Ceramic ball shot (size 100 $\mu$m) | Chromic acid treatment |
|  | 2 | 60 vol % $Cr_3C_2$—CoNiCrAlY | 100 |  |  |  |
|  | 3 | 40 vol % $ZrB_2$—NiCrAlY | 50 |  |  |  |
|  | 4 | 20 vol % $CrB_2$—CoNiCrAlY | 150 |  | Ceramic ball shot (size 300 $\mu$m) | Oxidation treatment |
|  | 5 | 50 vol % $ZrO_2$—$Y_2O_3$—CoCrAlY | 80 | D-gun | Fe ball shot (size 50 $\mu$m) |  |
|  | 6 | 50 vol % $ZrO_2$—$Y_2O_3$—CoCrAlY | 50 | HVOF | $Al_2O_3$ fiber filament brush | Silica oxide coating treatment |
|  | 7 | 10 vol % $Al_2O_3$—CoCrAlYTAa | 100 |  |  | Alumina oxide coating treatment |
|  | 8 | CoNiCrAlY | 200 |  |  | Zirconia oxide coating treatment |
|  | 9 | 45 vol % $Cr_2O_3$—CoCrAlYTa | 300 |  |  | Silica oxide coating treatment |
|  | 10 | 80 vol % $Al_2O_3$—CoCrAlY | 80 |  | Ceramic ball shot (size 100 $\mu$m) | Chromic acid treatment |
|  | 11 | 20 vol % $CrB_2$—CoNiCrAlY | 150 |  | Ceramic ball shot (size 300 $\mu$m) | Oxidation treatment |
| C. ex. | 1 | 85 vol % $Al_2O_3$—CoCrAlY | 70 | HVOF | Ceramic ball shot (size 100 $\mu$m) | None |
|  | 2 | 90 vol % $Cr_3C_2$—CoNiCrAlY |  |  |  | None |
|  | 3 | CoNiCrAlY (undercoat) 10 wt % $Y_2O_3$—$ZrO_3$ (top coat) | 150 | Plasma | $Al_2O_3$ fiber filament brush | None |
|  | 4 | 30 vol $Al_2O_3$—CoCrAlY | 80 | D-gun | None | None |

|  |  | Roughness parameter |  |  |  |  |  | Evaluation |  |  |
|---|---|---|---|---|---|---|---|---|---|---|
|  |  | Cutoff 2.5 mm |  | Cutoff 0.25 mm |  | Ratio |  |  | Build- | Over- |
|  |  | Ra | Rz | Ra' | Rz' | Ra/Ra' | Rz/Rz' | Walk | up | all |
| Inv. ex. | 1 | 4.4 | 22.9 | 0.9 | 4.5 | 4.9 | 5.1 | None | None | Good |
|  | 2 | 4.3 | 19.8 | 0.8 | 4.1 | 5.4 | 4.8 | None | None | Good |
|  | 3 | 4.6 | 21.5 | 0.9 | 4.8 | 5.1 | 4.5 | None | None | Good |
|  | 4 | 10.5 | 50.0 | 1.7 | 9.9 | 6.2 | 5.1 | None | None | Good |
|  | 5 | 4.7 | 23.7 | 0.9 | 4.1 | 5.2 | 5.8 | None | None | Good |
|  | 6 | 12.6 | 55.6 | 1.9 | 10.6 | 6.6 | 5.2 | None | None | Good |
|  | 7 | 15.5 | 15.5 | 70.5 | 2.8 | 12.7 | 5.5 | None | None | Good |
|  | 8 | 5.7 | 24.8 | 0.9 | 4.8 | 6.3 | 5.2 | None | None | Good |
|  | 9 | 6.3 | 32.4 | 1.0 | 5.9 | 6.3 | 5.5 | None | None | Good |
|  | 10 | 4.1 | 18.7 | 0.9 | 4.0 | 4.6 | 4.7 | None | None | Good |
|  | 11 | 8.5 | 38.5 | 2.1 | 7.5 | 4.0 | 5.1 | None | None | Good |
| C. ex. | 1 | 4.5 | 23.9 | 0.8 | 4.7 | 5.6 | 5.1 | None | Yes | Poor |
|  | 2 | 4.3 | 23.3 | 0.7 | 4.9 | 6.1 | 4.8 | None | Yes | Poor |
|  | 3 | 4.0 | 21.5 | 0.8 | 3.9 | 5.0 | 5.5 | None | Yes | Poor |
|  | 4 | 1.2 | 5.8 | 0.5 | 2.8 | 2.4 | 2.1 | Yes | Yes | Poor |

* Invention Example 10 is same in conditions as Invention Example 1, but the undercoat layer of the heat resistant alloy CoNiCrAlY was embellished before flame spraying.
* Invention Example 11 is same in conditions as Invention Example 4, but matrix material roll having inclined tapered parts at the time ends was used and the cutoff 0.8 mmRa of the tapered parts was 0.5 $\mu$m.
* value of roughness in roughness parameter column is measured after treatment after processing.

INDUSTRIAL APPLICABILITY

According to the present invention, it becomes possible to provide conveying rolls and hearth rolls in a continuous annealing furnace able to simultaneously solve the problems slip and walk and sticking of dust and buildup becoming problems at the time of processing steel sheet. For this reason, it is possible to prevent flaws in the steel sheet due to the rolls so as to improve the quality of the steel sheet and possible to process steel sheet stably at a high speed, and improve the productivity. The present invention has great industrial applicability.

The invention claimed is:

1. A conveying roll for producing steel sheet having a flame sprayed coating on its surface, said conveying roll characterized in that the flame sprayed coating is comprised of cermet with a ceramic ingredient content of 80 vol % or less and a heat resistant alloy, the flame sprayed coating has an oxide layer of one or more types of a flame sprayed metal, Cr, Si, Zr, and Al on it, and a ratio R/R' of a roughness parameter R of the surface of said oxide layer measured based on JIS B0633 setting a cutoff value to an initial value and a roughness parameter R' measured setting a cutoff value to 1/10 of said initial value is 4 or more.

2. A conveying roll as set forth in claim 1 characterized in that said roughness parameter is any of an arithmetic mean roughness Ra, root mean square roughness Rq, maximum peak height Rp of roughness curve, maximum valley depth Rv of roughness curve, and maximum height roughness Rz.

3. A conveying roll as set forth in claim 1 or 2 characterized by further having an undercoat layer of a heat resistant alloy between a roll matrix surface and the flame sprayed coating.

4. A conveying roll as set forth in claim 1 characterized in that the oxide layer has a thickness of 0.01 μm to 10 μm.

5. A hearth roll in a continuous annealing furnace using a conveying roll as set forth in claim 1 or 2, said hearth roll in a continuous annealing furnace characterized in that a roughness parameter Ra of a straight part of the circumference measured setting the cutoff value to 2.5 mm is 2 μm or more.

6. A hearth roll in a continuous annealing furnace as set forth in claim 5, characterized in that it has a straight part at a center part in the axial direction of the circumference, is provided with tapered parts at the two ends of said straight part, and has a roughness parameter Ra of said tapered parts measured setting the cutoff value at 0.8 mm of 0.1 to 2 μm.

* * * * *